June 28, 1960  L. WIEDMANN  2,942,710
CLUTCH DEVICE
Filed March 26, 1957
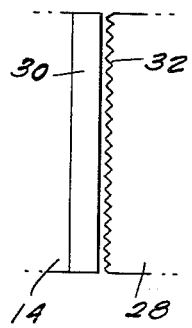
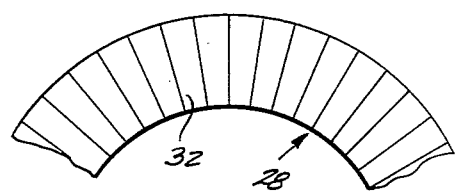
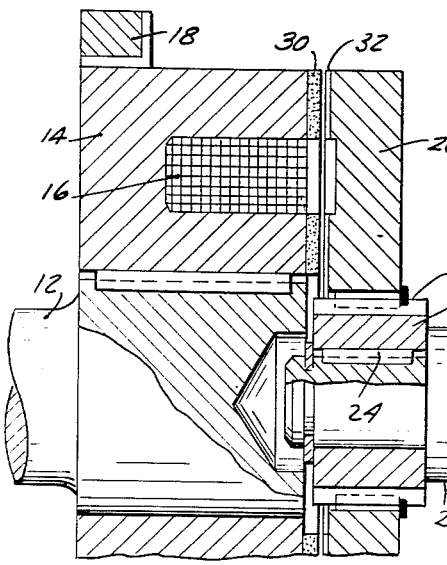
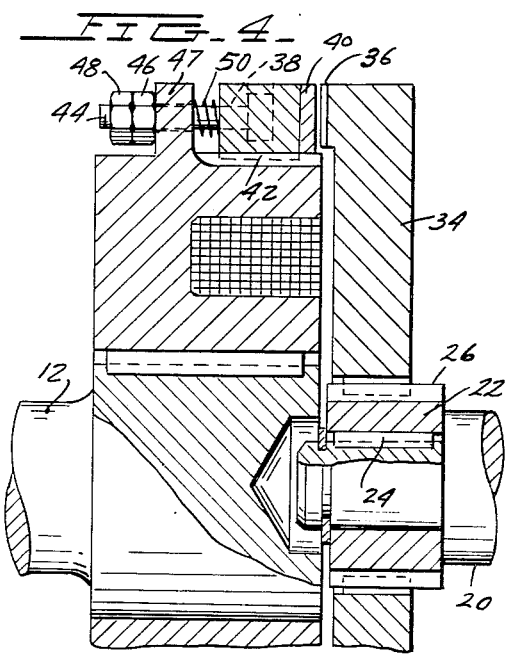
INVENTOR.
LUDWIG WIEDMANN
BY
ATTORNEYS

United States Patent Office 2,942,710
Patented June 28, 1960

2,942,710
CLUTCH DEVICE

Ludwig Wiedmann, Friedrichshafen, Germany, assignor to I-T-E Circuit Breaker Company, Philadelphia, Pa., a corporation of Pennsylvania Filed Mar. 26, 1957, Ser. No. 648,721

2 Claims. (Cl. 192—84)

My invention relates to clutch devices and is more specifically directed to a clutch device wherein one cooperating clutch surface is of elastic material while the other cooperating clutch surface may be of metallic material and has the surface thereof roughened as by grooving or knurling wherein substantially slip-free clutching is achieved.

While my novel invention is applicable to any type of clutch, the elastic medium of the cooperating clutch surface which is engageable with a roughened surface of the other clutch member may have magnetic particles embedded therein to be utilized in an electromagnetic type clutch wherein the magnetic path is taken through the elastic clutch surface.

Hence my novel clutch device may offer many of the advantages of electromagnetic actuated clutch devices and in addition gives a clutching action which is substantially slip-free in view of the engagement between the elastic surface of one clutch member and the roughened surface of its cooperating clutch member.

Furthermore, this invention may be applied to clutch devices of the type using interleaved magnetic laminations as set forth in Patent No. 2,254,625 issued September 2, 1941 to Ryba wherein alternate clutch laminations may be formed of the elastic material having magnetic particles embedded therein to offer a magnetic flux path while laminations adjacent or interposed between the elastic laminations are metallic and have a roughened surface.

Accordingly, a primary object of my invention is to provide a novel clutching medium for clutch devices.

Another object of my invention is to provide a novel clutch device which utilizes a first elastic clutch surface which cooperates with a second roughened surface which may be of metallic material.

Still another object of my invention is to provide a clutch device wherein the cooperating clutch members have elastic and roughened metallic surfaces respectively.

A further object of my invention is to provide a novel clutch device utilizing clutching members having an elastic and roughened metallic surface respectively wherein the elastic surfaces contained magnetic powders or particles for conducting a magnetic flux so that the clutch device may be electromagnetically actuated.

Still another object of my invention is to provide a clutch device wherein the clutching operation is substantially slip-free.

These and other objects of my invention will become apparent from the following description when taken in connection with the drawings, in which:

Figure 1 shows a fragmentary top view of the clutch embodiment set forth in Figure 2.

Figure 2 shows a cross-sectional view of one embodiment of my novel invention.

Figure 3 shows a partial front view of the armature member of Figure 2.

Figure 4 shows a side cross-sectional view of a second embodiment of my novel invention wherein the flux path is not taken through the elastic clutching material.

Referring now to Figure 2, which shows an electromagnetic clutch, a driving member comprising the shaft 12 may be connected to some source of driving power (not shown), the shaft 12 being keyed to a magnetic body 14 which contains an energizing coil 16 therein. The energizing coil 16 may be energized in any desired manner as through a collector ring means 18 with the other end of the coil grounded to the shaft 12. A driven or output shaft 20 is then coaxially mounted with respect to shaft 12 and is rotatable with respect therewith and mounts a bushing 22 in any desired manner, as by the keying means 24. The outer circumference of bushing 22 contains splines such as spline 26 which mount the armature member 28 in such a manner that they will be axially movable with respect to the driven shaft 20, but rotatably movable with armature member 28.

In accordance with my novel invention, the clutching surface of the magnet body 14 is provided with an elastic material 30 having magnetic particles suspended therein as is schematically shown in the drawing. The cooperating clutching surface 32 of the armature disk 28 is, as may be best seen in Figures 1 and 3, provided with grooves so that the surface will be roughened with respect to the elastic material 30 of the magnet body 14.

Clearly, however, the roughened surface could be achieved by methods other than by grooving, as for example, by knurling.

The depth of the roughened surface 32 as well as the elasticity of member 30 are varied with respect to the specific application of the clutch. Thus, if a very small degree of slip is required, the depth of the grooves of surface 32 may be increased and the elasticity of surface 30 may be similarly controlled so that there will be relatively deep penetration of the elastic material 30 by the roughened surface 32 upon clutch engagement.

In operation, the armature disk 28 will be normally maintained to the right by a biasing means (not shown) so that there will normally be no engagement between the surfaces 30 and 32 and therefore shafts 12 and 20 will be disengaged.

When, however, it is desired to operatively connect the output shaft 20 to the input shaft 12, the energizing coil 16 is energized to thereby pass a magnetic flux through the armature 28 in series with the elastic material 30 which, by virtue of the magnetic material embedded therein, may have a relatively high permeability. Hence the armature 28 will be attracted towards the left and there will be engagement between the roughened surface 32 and the elastic material 30.

Because of the nature of these cooperating surfaces, the engagement will be substantially slip-free and the output shaft 20 will be substantially immediately operatively connected to the input shaft 12.

A second embodiment of my invention is set forth in Figure 4 wherein similar components to Figure 2 have been identified with similar numerals.

The device of Figure 4 differs from the device of Figure 2 in that the elastic material of the clutching surface is not positioned in the magnetic path of the electromagnetic structure. Furthermore, Figure 4 shows a novel adjusting means wherein the slip characteristics of the clutch may be controlled and adjustment due to wear may be achieved. Thus, the armature disk 34, instead of being roughened or grooved as seen in Figure 3 for for the case of the clutch of Figure 2 over the entire magnetically active surface, is roughened only at its outer circumferential portions.

The clutch surface which cooperates with threaded surface 36 of armature member 34 is comprised of the axially adjustable member 38 having an elastic surface 40 fastened thereto in any desired manner. Member 38 is splined to the magnet body 14 by the spline 42 and has a shaft 44 which extends through a protruding ear 47 of the magnet body 14. There may be a plurality of these assemblies positioned about the circumference of the magnet body 14 in order to equally distribute the operating forces. The left hand portion of shaft 44 is threaded and receives the adjusting nuts 46 and 48 which adjust the extreme right hand position of member 38, this extreme position being maintained by the biasing spring 50.

In operation, the armature member 34 of Figure 4 will be attracted towards the left in response to energization of coil 16 with the clutch surface 40 being removed from the magnetic path. Hence, when the coil 16 is energized, the grooved or knurled surface of armature member 34 will move into engagement with the elastic surface 40 of the cooperating clutch member 38 fastened to magnet body 14. Movement of member 38 to the left during clutch engagement is opposed by the biasing spring 50.

Clearly, this engagement will take place simultaneously at each of the elastic members positioned about the circumference of the magnet body. The initial engaging force may be easily adjusted by an adjustment either of the spring 50 or the adjusting nuts 46 and 48 or both.

A further modification of my novel invention is possible wherein the cooperating clutch surfaces are arranged in a conical shape whereby a greater clutching area is provided for any particular radial dimension.

Although I have here disclosed preferred embodiments of my novel invention, many modifications and variations will now be obvious to those skilled in the art. I prefer therefore to be limited, not by the specific disclosure herein, but only by the appended claims.

I claim:
1. A clutch device comprising a first and second clutch member connectible to a driving and driven member respectively, said first and second clutch members having clutch surfaces movable into and out of engagement with one another for operatively connecting and disconnecting respectively said driving and driven members; electromagnetic energizing means for creating a magnetic field linking at least a portion of said first and second clutch members; said first and second clutch members being moved into engagement with one another responsive to energization of said electromagnetic energizing means; one of said clutch surfaces being at least partially comprised of an elastic medium, the other of said clutch surfaces being comprised of a roughened, non-elastic medium; said elastic medium having a high permeability; at least a portion of said magnetic field passing through said elastic medium.

2. A clutch device comprising a first and second clutch member connectible to a driving and driven member respectively, said first and second clutch members having clutch surfaces movable into and out of engagement with one another for operatively connecting and disconnecting respectively said driving and driven members; electromagnetic energizing means for creating a magnetic field linking at least a portion of said first and second clutch members; said first and second clutch members being moved into engagement with one another responsive to energization of said electromagnetic energizing means; one of said clutch surfaces being at least partially comprised of an elastic medium, the other of said clutch surfaces being comprised of a roughened, non-elastic medium; said elastic medium having magnetic particles embedded therein to allow said elastic material to have a high permeability; at least a portion of said magnetic field passing through said elastic medium.

References Cited in the file of this patent

UNITED STATES PATENTS

| 2,481,028 | Lear | Sept. 6, 1949 |
| 2,580,869 | Winther | Jan. 1, 1952 |
| 2,738,044 | Winther | Mar. 13, 1956 |
| 2,757,768 | Landerer | Aug. 7, 1956 |

FOREIGN PATENTS

| 645,700 | Great Britain | Nov. 8, 1950 |